(12) United States Patent
Sekino et al.

(10) Patent No.: US 9,656,577 B2
(45) Date of Patent: May 23, 2017

(54) VEHICLE SEAT

(71) Applicant: TACHI-S CO., LTD., Akishima-shi, Tokyo (JP)

(72) Inventors: Hiroshi Sekino, Ome (JP); Tsutomu Fujikake, Ome (JP); Yutaka Sodeno, Ome (JP)

(73) Assignee: TACHI-S CO., LTD., Tokyo (JP)

( * ) Notice: Subject to any disclaimer, the term of this patent is extended or adjusted under 35 U.S.C. 154(b) by 0 days.

(21) Appl. No.: 15/026,762

(22) PCT Filed: Sep. 19, 2014

(86) PCT No.: PCT/JP2014/074770
§ 371 (c)(1),
(2) Date: Apr. 1, 2016

(87) PCT Pub. No.: WO2015/049999
PCT Pub. Date: Apr. 9, 2015

(65) Prior Publication Data
US 2016/0250948 A1 Sep. 1, 2016

(30) Foreign Application Priority Data
Oct. 1, 2013 (JP) .................................. 2013-206085

(51) Int. Cl.
*B60N 2/28* (2006.01)
*B60N 2/58* (2006.01)
*B60N 2/60* (2006.01)

(52) U.S. Cl.
CPC ............ *B60N 2/2893* (2013.01); *B60N 2/289* (2013.01); *B60N 2/2887* (2013.01); *B60N 2/5883* (2013.01); *B60N 2/6009* (2013.01)

(58) Field of Classification Search
CPC ..... B60N 2/2887; B60N 2/289; B60N 2/5883; B60N 2/6009; B60N 2/58
(Continued)

(56) References Cited

U.S. PATENT DOCUMENTS 7,281,763 B1* 10/2007 Hayashi ............... B60N 2/2893
297/253
2002/0104190 A1 8/2002 Moore et al.
2016/0200224 A1* 7/2016 Fujikake ................ B60N 2/289
297/452.38

FOREIGN PATENT DOCUMENTS

DE 102009036726 A1 * 2/2011 ........... B60N 2/2887
FR 2975643 A1 * 11/2012 ............ B60N 2/289
(Continued)

OTHER PUBLICATIONS

International Search Report corresponding to Application No. PCT/JP2014/074770; Date of Mailing: Nov. 18, 2014.

*Primary Examiner* — Milton Nelson, Jr.
(74) *Attorney, Agent, or Firm* — Cantor Colburn LLP

(57) ABSTRACT

A vehicle seat includes a pair of anchors able to engage with engagement members provided on a child seat; a pad having a pair of pad recesses for storing anchors, a trim cover having openings above the pad recesses; and a pair of bezels being hollow cylinder shaped, each having an upper edge flange sewn at the outer edge to the terminal of the trim cover, and covering and hiding the associated pad recess, and each bezel is made of flexible material and has a lower edge flange formed integral with a lower end thereof capable of inserting into the pad recess, the pad has an engaging section capable of engaging with the lower edge flange, the lower edge flange may be deformed and inserted into the pad recess in order to make the bezel cover the pad recess, and the lower edge flange may restore its original shape.

12 Claims, 4 Drawing Sheets

(58) Field of Classification Search
USPC .......................................................... 297/253
See application file for complete search history.

(56) References Cited

FOREIGN PATENT DOCUMENTS

| | | | | |
|---|---|---|---|---|
| JP | 11105606 | A | 4/1999 | |
| JP | 2010064636 | A | 3/2010 | |
| JP | 2011121426 | A | 6/2011 | |
| JP | 4949371 | B2 * | 6/2012 | ........... B60N 2/6009 |
| JP | 2014/074770 | A | 11/2014 | |
| JP | EP 3000654 | A1 * | 3/2016 | ........... B60N 2/6009 |

* cited by examiner

Fr ⟷ Rr

VEHICLE SEAT

CROSS REFERENCE TO RELATED APPLICATIONS

This is the U.S. national stage of application No. PCT/JP2014/074770 dated Sep. 19, 2014. Priority under 35 U.S.C. §119(a) and 35 U.S.C. §365(b) is claimed from Japanese Patent Application No. 2013-206085, filed Oct. 1, 2013, the entire contents of which are incorporated herein by reference.

BACKGROUND OF THE INVENTION

Field of the Invention

This invention relates to a vehicle seat (a seat for vehicles) having anchors that accord with the ISO-FIX standard and can hold an ISO-FIX type child seat.

Description of the Related Art

The ISO-FIX standard is known as international standard of systems for holding child seats to vehicle seats. A vehicle seat is disclosed in, for example, JP 2010-064636A. The vehicle seat has anchors that accord with the ISO-FIX standard and can hold an ISO-FIX type child seat.

The child seat of ISO-FIX type has a pair of engagement members, i.e., left and right engaging members, at the rear part. The engagement members are engaged with anchors. The anchors may be arranged at the rear edge of the seat cushion of a vehicle seat or the lower edge of the seatback thereof.

An anchor is known, which has been formed by bending a wire member (or solid rod member). The anchor has a pair of side bars (i.e., left and right side bars) and a front bar. The left and right side bars extend forwards and parallel to each other. The front bar couples the upper (front) ends of the left and right side bars, and the anchor is substantially U-shaped as seen in the plan view.

The left and right engagement members are extending rearwards. Each engagement member has a bifurcated shape in side view and has, at the rear end, a groove. The front bar of each anchor may be engaged in the groove made in the rear end of the engagement member, to hold the child seat to the vehicle seat.

In most cases, the lower arm of each engagement member is shorter than the upper arm, and may smoothly come into engagement with the front bar of the associated anchor.

The anchors are provided at the rear edge of the seat cushion or the lower edge of the seatback. The seat cushion and the seatback are each composed of a frame (i.e., skeleton member, namely seat cushion frame or seatback frame), a pad made of foamed material such as urethane foam and covering the frame, and a trim cover covering the pad. Recesses in which the anchors are arranged are prepared on the pad. To provide the anchors at the rear edge of, for example, the seat cushion, the seat cushion frame is composed of left and right side frames and two connecting pipes, one connecting front ends of the side frames and the other connecting the rear ends of the side frames. Therefore, the seat cushion frame is a substantially rectangular frame as seen in plan view. The anchors are secured to the rear connecting pipe and arranged in the recesses of the pad at the rear edge of the seat cushion.

If the pad recesses and the anchors arranged in the pad recesses are seen, the outer appearance of the vehicle seat will be impaired. It is therefore proposed that bezels sewn to the pad or secured to the pad with hook rings should cover the pad recesses to hide the pad recesses.

JP 2010-064636A, for example, discloses a configuration in which a pair of bezels, each having a rectangular flange and made of unwoven fabric impregnated with synthetic resin, are attached to the pad recesses, respectively. The left and right parts of the flange of each bezel are sewn at the edges of the trim cover located around the pad recess. The bezels are thereby held in the pad recesses. Each bezel has a slit made in the bottom wall, and the associated anchor projects into the associated bezel through the slit.

JP 2011-121426A discloses a configuration, in which the pad recesses are covered not with bezels, but with a trim cover that has a slide fastener, and the pad recesses are opened when the slider of the slide fastener slides from an upper position to a lower position. The left, right, upper and lower edges of the slide fastener are made of fabric. The left and right edges of the slide fastener are sewn to the terminal of the trim cover. Further, the upper and lower edges of the slide fastener are sewn to the terminal of the trim cover, together with suspension belts. The pad has a pulling-over groove, and the suspension belts hang into the pulling-over groove. A sling wire is stretched in each pad recess.

A hook ring couples the sling wire to the suspension belt. Therefore, the upper and lower edges of the slide fastener and the terminal of the trim cover are pulled into the pulling-over groove and secured to the sling wire. The sling wire is, for example, a wire provided in the seat cushion and extending between the left and right side frames of the seat cushion.

Patent Literature 1: Japanese Patent unexamined Publication JP 2010-064636A

Patent Literature 2: Japanese Patent unexamined Publication JP 2011-121426A

In the configuration disclosed in JP 2010-064636A, the flange of each bezel is sewn, at end, to the terminal of the trim cover around the pad recess and secures the terminal of the trim cover. Therefore, the flange of the bezel may move up from the pad, and the occupant or a baggage may hitch the flange of the bezel and turn it over. If the flange of the bezel is turned over, the vehicle seat will be impaired in outer appearance. If a large force is applied to the bezel so turned over, the sewing thread will be cut, and the flange of the bezel will no longer be sewn to the terminal of the trim cover. In this case, the bezel comes out of the pad recess or greatly project from the pad recess. As a result, the flange of the bezel abuts on the buttocks of the occupant, possibly making the occupant feel uncomfortable.

The configuration disclosed in JP 2011-121426A has no bezels. Any problem resulting from a bezel that moves up from the pad will not arise at all. If the slider is moved up and down to open the pad recess, a pulling force is indeed applied to the slide fastener, possibly tearing the slide fastener from the trim cover. Nonetheless, the sling wire receives the pulling force because the suspension belt couples and secures the sewn part to the sling wire. Hence, the slide fastener is hardly torn from the trim cover, and will hardly turn over.

However, the hook ring and the suspension belt are indispensable because they secure the slide fastener to the sling wire. Inevitably, the vehicle seat comprises more independent components than otherwise. Further, since the slide fastener must be fixed to the sling wire, requiring an additional step. This renders the setting process more complex.

As described above, the hook ring and the suspension belt secure the slide fastener to the sling wire. Since this configuration has no bezels, any problem does not arise, which would arise if bezels turned over. Moreover, the slide fastener can hardly turn over because the sling wire receives the pulling force applied to slide the slider. However, the hook ring and the suspension belt are indispensable, increasing the number of components and complicating the setting process.

An object of this invention is to provide a vehicle seat in which the bezels can be fitted in the pad recesses, never moving up to turn over, without increasing the number of components or complicating the setting process.

SUMMARY OF THE INVENTION

To achieve the object, in this invention, each bezel has a lower edge flange formed integral and is made of flexible material, and an engaging section for engaging with the lower edge flange is provided on the pad.

More specifically, in this invention according to one aspect of the embodiment of claim 1, a vehicle seat includes a pair of anchors able to engage with engagement members provided on a child seat, thereby to hold the child seat; a pad having a pair of pad recesses, provided either at a rear edge of a seat cushion or a lower edge of a seatback, for storing the anchors; a trim cover covering the pad and having openings above the pad recesses; and a pair of bezels being hollow cylinder shaped, each having an upper edge flange sewn at the outer edge to the terminal of the trim cover, and covering and hiding the associated pad recess; wherein each bezel is made of flexible material and has a lower edge flange formed integral with a lower end thereof capable of inserting into the pad recess, the pad has an engaging section capable of engaging with the lower edge flange, the lower edge flange is deformed and inserted into the pad recess in order to make the bezel cover the pad recess, and the lower edge flange restores its original shape, because of its elasticity when the bezel is inserted into the pad recess and passes by the engaging section, the lower edge flange is engaged with the engaging section of the pad and the bezel covers in the pad recess.

In the invention of claim 1, if the lower edge flange is deformed and inserted into the pad recess, it restores its original shape because of its elasticity and is engaged with the engaging section of the pad, causing each bezel to cover the associated pad recess. Therefore, the bezel can be easily fitted in the pad recess, not complicating the setting process.

Moreover, each bezel would not move up to turn over, since the lower edge flange is engaged with the engaging section of the pad.

It is good enough to form a lower edge flange on each bezel and engaging sections on the pad. That is, the bezels and the pad only need be changed in configuration. Hence, components such as a hook rings and a suspension belt are unnecessary, and the number of indispensable components would not increase.

DETAILED DESCRIPTION OF THE INVENTION

A vehicle seat comprises a pair of anchors able to engage with engagement members provided on a child seat, thereby to hold the child seat; a pad having a pair of pad recesses, provided either at a rear edge of a seat cushion or a lower edge of a seatback, for storing the anchors; a trim cover covering the pad and having openings above the pad recesses; and a pair of bezels being hollow cylinder shaped, each having an upper edge flange sewn at the outer edge to the terminal of the trim cover, and covering and hiding the associated pad recess; wherein each bezel is made of flexible material and has a lower edge flange formed integral with a lower end thereof capable of inserting into the pad recess, the pad has an engaging section capable of engaging with the lower edge flange, the lower edge flange is deformed and inserted into the pad recess in order to make the bezel cover the pad recess, and the lower edge flange restores its original shape, because of its elasticity when the bezel is inserted into the pad recess and passes by the engaging section, the lower edge flange is engaged with the engaging section of the pad and the bezel covers in the pad recess.

Embodiment

Figure 1:
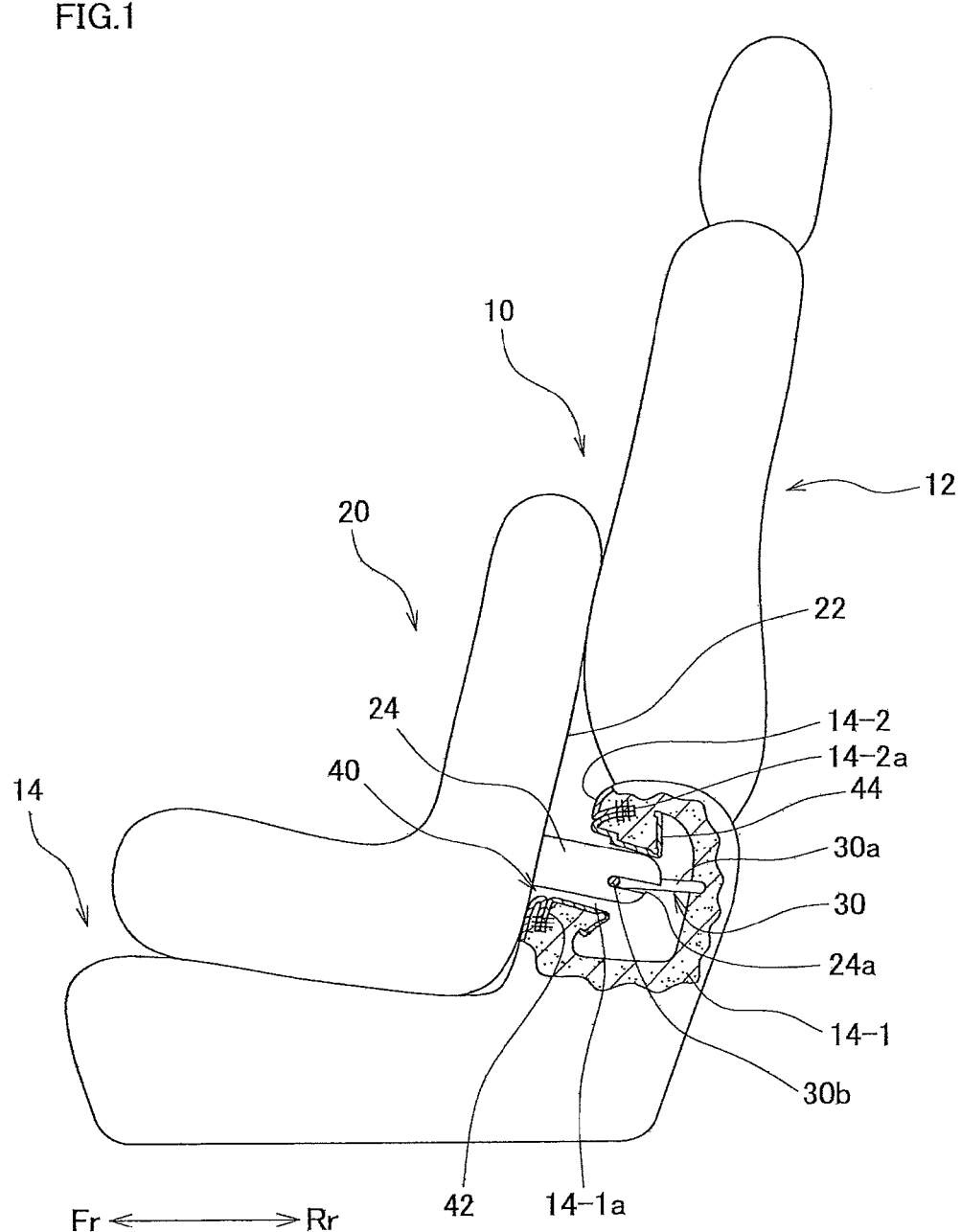
FIG. 1 is a schematic side view of a vehicle seat according to an embodiment of this invention.
Figure 2A:
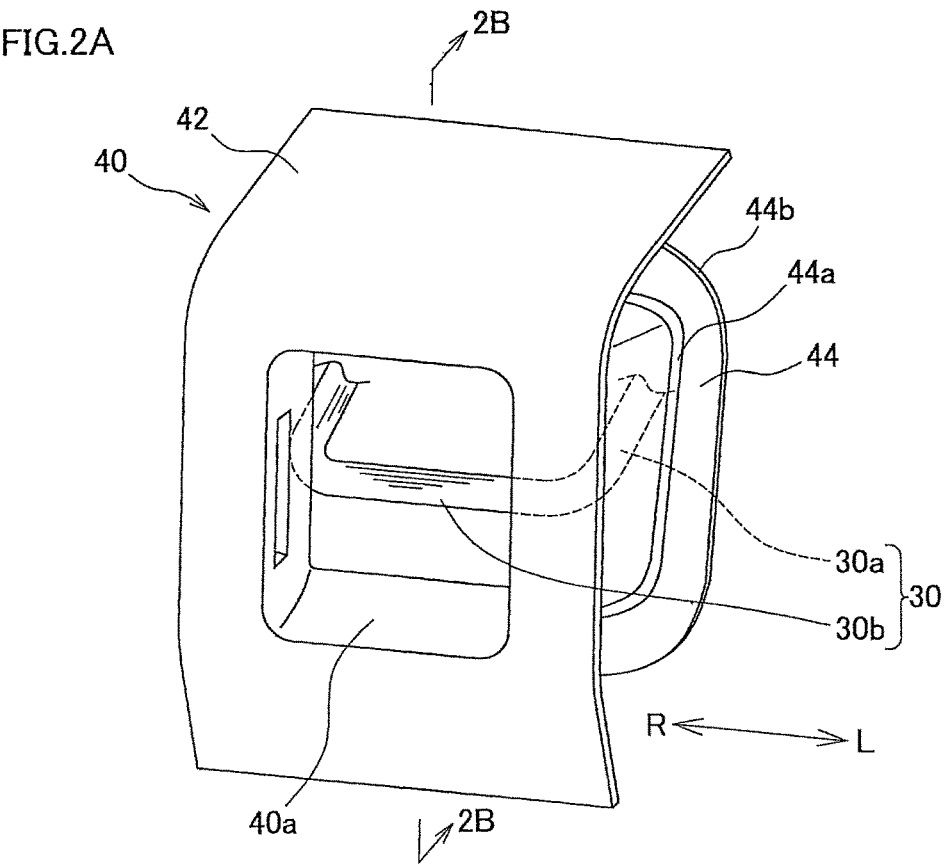
FIG. 2A is a perspective view of the bezel and the anchor, used in the vehicle seat according to the embodiment of this invention.
Figure 2B:
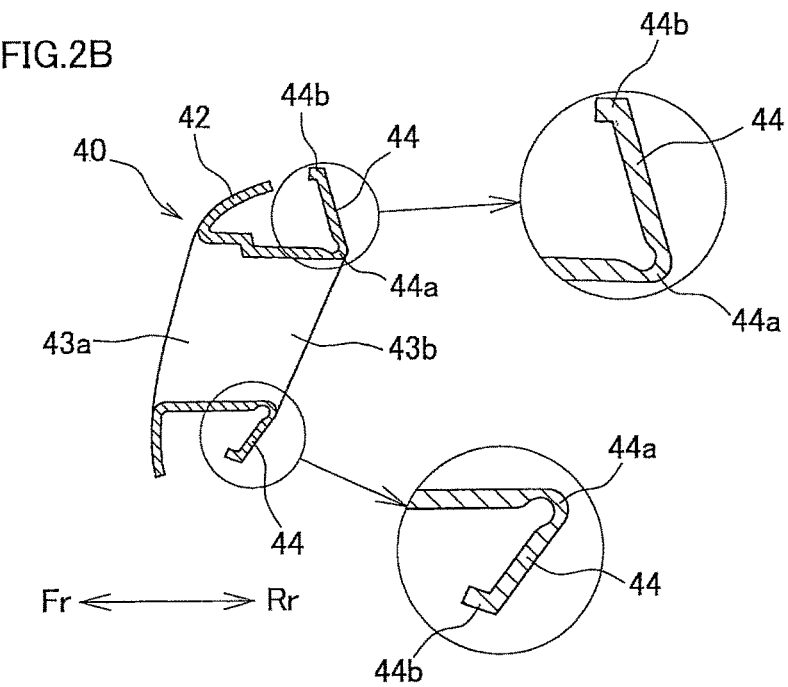
FIG. 2B is a sectional view of the bezel, taken along line 2B-2B shown in FIG. 2A.
Figure 3A:
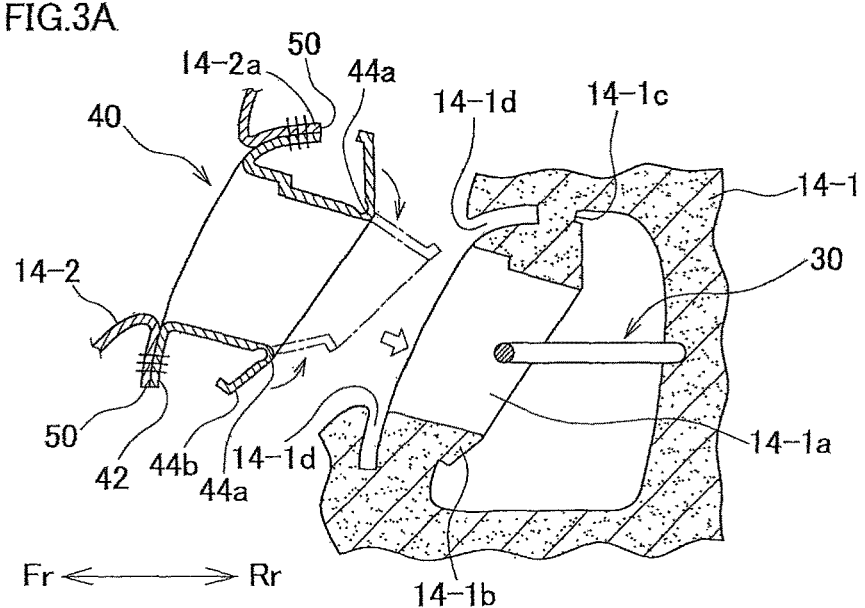
FIG. 3A is a magnified partly sectional view, showing the state the bezel and the pad assume while the bezel is not attached into the pad recess yet.
Figure 3B:
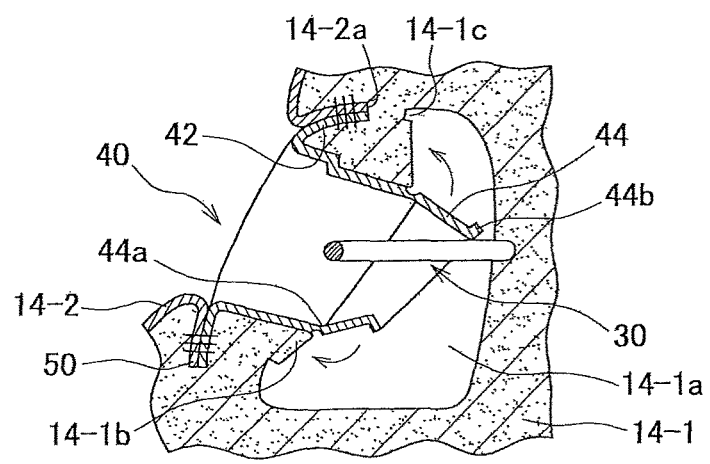
FIG. 3B is a magnified partly sectional view, showing the state the bezel and the pad assume while the bezel is attached into the pad recess and the lower edge flange of the bezel is not restored to its original shape.
Figure 3C:
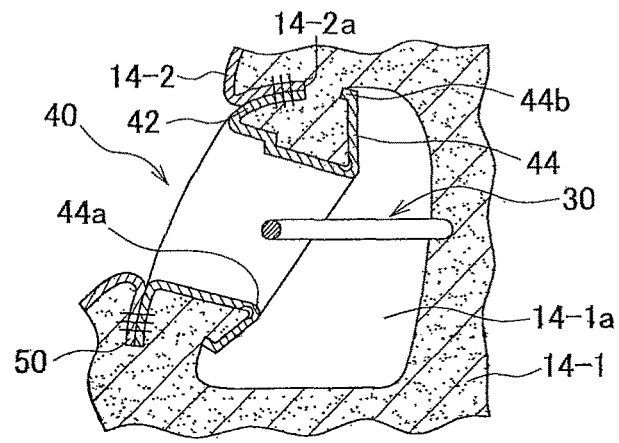
FIG. 3C is a magnified partly sectional view, showing the state the bezel and the pad assume while the bezel is attached into the pad recess and the lower edge flange of the bezel is restored to its original shape.
Figure 4:
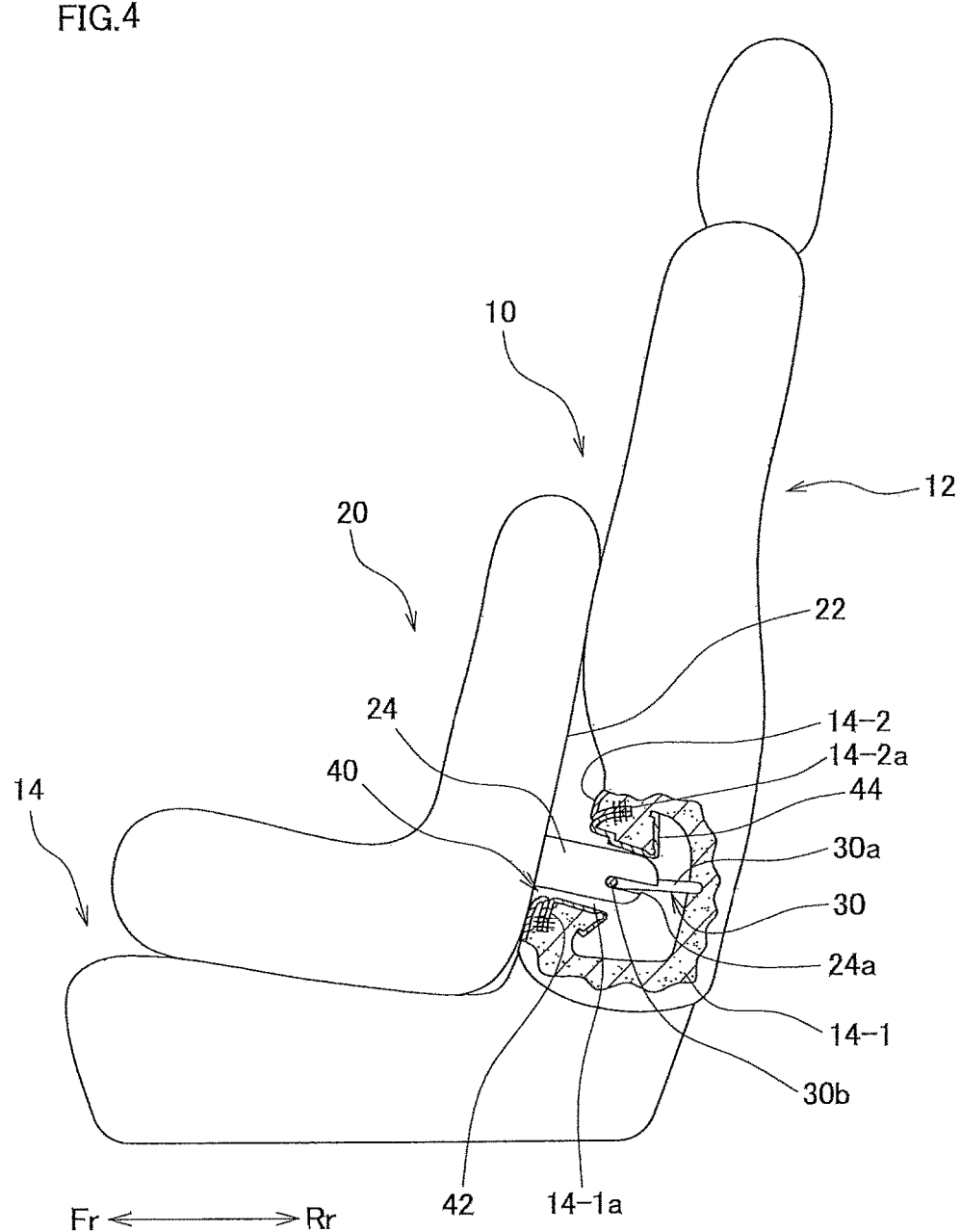
FIG. 4 is a schematic side view of a vehicle seat according to another embodiment of this invention.

Embodiments of this invention will be described with reference to the accompanying drawings. FIG. 1 is a schematic side view of a vehicle seat according to an embodiment of this invention. FIG. 2A is a perspective view of the bezel and the anchor, used in the vehicle seat according to the embodiment of this invention. FIG. 2B is a sectional view of the bezel, taken along line 2B-2B shown in FIG. 2A. FIG. 3A is a magnified partly sectional view, showing the state the bezel and the pad assume while the bezel is not attached into the pad recess yet. FIG. 3B is a magnified partly sectional view, showing the state the bezel and the pad assume while the bezel is attached into the pad recess and the lower edge flange of the bezel is not restored to its original shape. FIG. 3C is a magnified partly sectional view, showing the state the bezel and the pad assume while the bezel is attached into the pad recess and the lower edge flange of the bezel is restored to its original shape. FIG. 4 is a schematic side view of a vehicle seat according to another embodiment of this invention. In the drawings, arrows Fr and Rr indicate the forward and rearward directions, and arrows L and R indicate the leftward and rightward directions, with respect to the driver seated in the driver seat.

As shown in FIG. 1, the vehicle seat (seat for vehicles) 10 comprises a seatback 12 and a seat cushion 14. A seat belt (not shown) is attached to the seat. The seat cushion 14 is composed of a cushion frame, a pad 14-1 made of foam such as urethane foam and covering the cushion frame, and a trim cover 14-2 covering the pad. The seatback 12 is similar to the seat cushion in terms of configuration.

The pad has a pair of recesses 14-1*a* (i.e., left and right recesses) that may hold the anchors. The trim cover 14-2 that covers the pad has openings positioned above the recesses.

As shown in FIG. 1, the (pad) recesses 14-1*a* are made in the rear edge of the seat cushion 14. The configuration is not limited to this, nonetheless. The recesses may be provided in the lower edge of the seatback 12, as shown in FIG. 4.

On the rear edge of the seat cushion 14, for example, a pair of ISO-FIX anchors 30 are arranged and spaced apart by a prescribed distance in the left-right direction of the vehicle seat 10, in order to hold a child seat 20 of the ISO-FIX type.

As shown in FIG. 1, the child seat 20 has on the back 22 a pair of engagement members (i.e., left and right members) 24. Each engagement member has upper and lower arms at the distal end, is shaped like a two-branch fork as seen from the side, and has an elongated groove (notch) 24*a* made between the upper and lower arms.

As shown in FIG. 2A, each anchor has been made by bending a wire member (i.e., solid bar), shaped substantially like letter U as viewed in a plane. Each anchor has a pair of side bars 30*a* extending forward in parallel to each other and a front bar 30*b* connecting the front ends of the side bars. A connecting pipe, for example, extends between the rear ends of the left and right side frames of the seat cushion. The rear ends of the side bars of each anchor are secured to the connecting pipe. Each anchor extends forwards from the connecting pipe.

In most cases, the left and right engagement members 24 approach the anchors 30 from the front while the back of the child seat remains sunk and inclined. When the elongate groove (notch) 24*a* of each engagement member comes into engagement with the front bars of the associated anchor, the child seat 20 is held by the anchors and arranged on the seat cushion 14. When each of the engagement members is engaged with the front bar 30*b* of the associated anchor, the front bar reach the end of the elongated groove 24*a* and the engagement members is therefore engaged with the associated front bar, the anchors 30 hold the child seat 20 steadfast.

Each pad recess 14-1*a* is covered with one bezel 40 shaped like a hollow cylinder and having a flange (upper edge flange) 42 at the upper end and a flange (lower edge flange) 44 at the lower end. The interior of the pad recess is therefore concealed. The bezel 40 is made of flexible material, opens at the upper and lower ends. The upper edge flange 42 and the lower edge flange 44 are formed integral and arranged around the upper opening 43*a* and lower opening 43*b*, respectively.

As shown in FIG. 2A, the upper edge flange 42 and the lower edge flange 44 are shaped like a rectangle as viewed from the front. As shown in FIG. 2B, the upper and lower edges of the upper edge flange 42 extend rearward, flaring from each other, and the left and right edges thereof are formed flat. The lower edge flange 44 has upper, lower, left and right edges, each flaring forward.

The root of the lower edge flange 44 has a thin-wall part 44*a*, which has been formed by cutting the part defining the outer circumference of the lower opening 43*b*. At the outer edge of the outer circumference of the lower edge flange 44, an engaging protrusion 44*b* is formed, extending forward. The engaging protrusion 44*b* is shaped, for example, like a ring, extending all around the upper, lower, left and right edges, and has a substantially L-shaped cross section. The cross section of the engaging protrusion 44*b* is not limited to an L-shaped one, nevertheless. The position of the engaging protrusion 44*b* is not limited to the outer edge of the lower edge flange. The engaging protrusion may be provided inside the outer edge of the lower edge flange. Instead of one engaging protrusion, a plurality of engaging protrusions may be arranged concentrically.

As shown in FIG. 3A, each pad recess 14-1*a* has a large diameter at the bottom. At the bottom of the pad recess, an engaging section 14-1*b* bent in the same manner as the lower edge flange 44 of the bezel is formed on the bottom of the pad recess, which has a large diameter. The engaging section 14-1*b* can engage with the lower edge flange 44 of the bezel. An engaging groove 14-1*c* shaped like a ring is cut in the pad, at the engaging section 14-1*b*, for example around the outer edge thereof. The engaging protrusion 44*b* provided on the outer circumference of the lower edge flange can engage in the engaging grooves 14-1*c*.

A terminal 14-2*a* (see FIGS. 1, 3A, 3B, 3C, and 4) of the trim cover 14-2 is laid on the upper surface of the upper edge flange 42 of the bezel and is sewn to the upper edge flange. The bezel is thereby made integral with the trim cover. Of the sewn parts formed by sewing the upper edge flange 42 to the terminal 14-2*a* of the trim cover 14-2, the upper and lower edges of the upper edge flange, which flare slantwise and backward, and the terminal 14-2*a* of the trim cover constitute sewn parts 50. The sewn parts 50 can be stored in storing grooves 14-1*d*. The storing grooves 14-1*d*, which extend straight and can store the sewn parts 50 are provided in the upper surface of the pad 14-1, respectively above and below the pad recess 14-1*a*. The storing grooves 14-1*d* flares slantwise and backward in the same way as does the upper edge flange.

The upper and lower edges of the upper edge flange 42 flare slantwise and rearward, and the upper, lower, left and right edges of the lower edge flange 44 flare slantwise and forward.

The lower edge flange 44 extends slantwise and straight, whereas the upper edge flange 42 is slightly arced upwards.

In the embodiment, the storing grooves 14-1*d* corresponds to a pulling-over groove into which the parts of the bezel flange, sewn to the terminal 14-2*a* of the trim cover, are pulled by using a hook ring and a suspension belt in the known configuration.

Each bezel 40 is used, covering one pad recess 14-1*a*, as will be explained below.

The lower edge flange 44 has an outside diameter larger than the opening of the pad recess 14-1*a*. Therefore, the lower edge flange 44 cannot be inserted into the pad recess to cover the pad recess. In view of this, the lower edge flange 44 is bent inwards as indicated by one-dot, dashed line in FIG. 3A, and is thereby reduced in size. Since the root of the lower edge flange 44 is made thin, forming the thin-wall part 44*a*, the lower edge flange can be folded back and deformed, with a small force, not a large force, using the thin-wall part as fulcrum. The lower edge flange 44 so deformed is inserted into the pad recess 14-1*a*, while pushing the sewn parts 50 constituted by the upper edge flange 42 and the terminal 14-2*a* of the trim cover 14-2 into the storing grooves 14-1*d*. As a result, the bezel 40 covers the pad recess.

When the lower edge flange 44 is inserted into the pad recess 14-1*a* and passes by the engaging section 14-1*b*, the user stops applying the force to deform the bezel. Then, at the thin-wall part 44*a* used as fulcrum, the lower edge flange expands outwards because of its elasticity and restores its original shape. Thus, lower edge flange is engaged with the engaging section 14-1*b* of the pad (see FIGS. 3B and 3C). When the lower edge flange 44 restores its original shape, the engaging protrusion 44*b* of the lower edge flange is engaged in the engaging groove 14-1*c* made in the pad.

As the lower edge flange 44 is inserted into the pad recess 14-1a, the sewn parts 50 constituted by the upper and lower edges of the upper edge flange 42 and the terminal 14-2a the trim cover are pulled deeper into the storing grooves 14-1d. At the time the lower edge flange restores its original shape and is therefore engaged with the engaging section 14-1b of the pad, the sewn parts 50 are fully stored in the storing grooves 14-1d and are concealed.

Thus, each bezel 40 can cover the associated pad recess, merely by deforming the lower edge flange 44 and inserting the same into the pad recess 14-1a until the lower edge flange moves over the engaging section 14-1b. Therefore, the bezel 40 can be easily fitted in and cover the pad recess 14-1a. No complicated step needs be performed to fit the bezel 40 in the pad recess.

The lower edge flange 44 of the bezel is engaging with the engaging section 14-1b of the pad, and prevents the bezel 40 from moving in the direction (i.e., forward direction) to slip out. Hence, the bezel would not move up to turn over.

The lower edge flange 44 and the engaging section 14-1b can be provided in the bezel 40 and the pad 14-1, respectively, merely by changing, in part, the configuration of the bezel and the configuration of the pad. Therefore, hook rings or suspension belts need not be used, and the number of the independent components for covering each bezel in one pad recess would not increase.

Not only the lower edge flange 44 is engaged with the engaging section 14-1b of the pad, but also the engaging protrusion 44b provided at the outer circumference of the lower edge flange is engaged in the engaging groove 14-1c made in the pad. Thus, the lower edge flange 44 and the engaging protrusion 44b prevent the bezel 40 from slipping out. This reliably prevents the bezel from moving up to turn over.

The sewn parts 50 constituted by the upper and lower edges of the upper edge flange 42 and the terminal 14-2a of the trim cover are stored in the storing grooves 14-1d made in the pad. Therefore, the upper edge flange 42 of the bezel would not be hitched by the occupant or a baggage to be turned over. Thus, the bezel is reliably prevented from turning over upwards or downwards.

Moreover, the sewn parts 50 are stored in the storing grooves 14-1d, and are concealed. Since the upper and lower edges of the upper edge flange 42 are not seen, the outer appearance of the vehicle seat is enhanced. Particularly, the upper edge flange can be hidden by the trim cover since the terminal 14-2a of the trim cover is laid on the upper edge flange 42 and is sewn thereto.

Needless to say, the bezel 40 would not move up to turn over. Further, the upper and lower edges of the upper edge flange are stored in the storing grooves 14-1d, together with the terminal 14-2a of the trim cover 14-2. Hence, the upper and lower edges of the upper edge flange would not abut on the occupant at the buttocks of the occupant, never making the occupant feel uncomfortable.

Moreover, the upper and lower edges of the upper edge flange 42 flare slantwise and backward. Therefore, if the sewn parts 50 constituted by the upper and lower edges of the upper edge flange 42 and the terminal 14-2a of the trim cover 14-2 are stored in the storing grooves 14-1d, the pad 14-1 will be positioned on the sewn parts 50 so stored. The pad 14-1, which lies on the sewn parts 50, prevents the bezel 40 from slipping out (namely, from moving forward). That is, the pad 14-1 provided on the sewn parts 50 interferes with the bezel 40, preventing the bezel from moving up or turning over.

In the embodiment, the left and right edges of the upper edge flange 42 are made flat, and the terminal 14-2a of the trim cover is laid on and sewn to the left and right edges of the upper edge flange. Instead, the left and right edges of the upper edge flange 42 may flare slantwise and backward as the upper and lower edges do, left and right storing grooves may be made around the pad recess 14-1a. In this case, the left and right edges of the upper edge flange 42 can be stored in the left and right storing grooves, and can therefore be concealed.

If the left and right edges of the upper edge flange 42 are stored and hidden in the left and right storing grooves of the pad, the vehicle seat will be more enhanced in outer appearance. Moreover, the pad 14-1 is arranged on the sewn parts 50 constituted by the upper edge flange of the bezel and the terminal 14-2a; of the trim cover. Therefore, the pad 14-1 prevents the bezel 40 from moving up (or forward) to slip out. This reliably prevents the bezel from moving up to turn over.

As has been described, in this invention, if the lower edge flange is deformed and inserted into the pad recess, it will restore its original shape because of its elasticity, and will be engaged with the engaging section of the pad. As a result, the bezel covers the pad recess. The bezel can therefore be easily fitted in the pad recess. Thus, the step of fitting the bezel in the pad recess is not complicated. Moreover, the bezel never moves up to turn over because the lower edge flange is engaged with the engaging section of the pad. Furthermore, since each bezel and the pad can be modified in configuration, components such as hook rings and suspension belts need not be used. Hence, the number of indispensable components would not increase.

The embodiments have been described to explain this invention, and are not intended to limit the scope of the invention. Accordingly, various changes and modifications may be made within the spirit or scope of this invention, and are of course included in this invention.

INDUSTRIAL APPLICABILITY

This invention is not limited to an ordinary vehicle seat for use in buses, cars and the like. It can be applied also to seats (vehicle seats) having anchors for holding a child seat, for use in trains and aircraft.

What is claimed is:
1. A vehicle seat comprising:
a pair of anchors able to engage with engagement members provided on a child seat, thereby to hold the child seat;
a pad having a pair of pad recesses, provided either at a rear edge of a seat cushion or a lower edge of a seatback, for storing the anchors;
a trim cover covering the pad and having openings above the pad recesses; and
a pair of bezels being hollow cylinder shaped, each having an upper edge flange sewn at the outer edge to a terminal of the trim cover, and covering and hiding the associated pad recess;
wherein each bezel is made of flexible material and has a lower edge flange formed integral with a lower end thereof capable of inserting into the pad recess,
the pad has an engaging section capable of engaging with the lower edge flange,
the lower edge flange is deformed and inserted into the pad recess in order to make the bezel cover the pad recess, and the lower edge flange restores its original shape, because of its elasticity when the bezel is inserted into the pad recess and passes by the engaging section, the lower edge flange is engaged with the engaging section of the pad and the bezel covers the pad recess.

2. The vehicle seat according to claim 1,
wherein sewn parts are formed by sewing the upper edge flange of the bezel to the terminal of the trim cover and,
storing grooves are made in the upper surface of the pad above and below the pad recess, in which the sewn parts are capable of storing.

3. The vehicle seat according to claim 2,
wherein the upper edge flange of the bezel is formed to flare slantwise and backward.

4. The vehicle seat according to claim 1,
wherein an engaging groove is cut in the pad, on the engaging section, and
on the lower edge flange of the bezel, an engaging protrusion is formed, extending forward and engaged in the engaging groove when the lower edge flange restores its original shape.

5. The vehicle seat according to claim 4,
wherein sewn parts are formed by sewing the upper edge flange of the bezel to the terminal of the trim cover and,
storing grooves are made in the upper surface of the pad above and below the pad recess, in which the sewn parts are capable of storing.

6. The vehicle seat according to claim 5,
wherein the upper edge flange of the bezel is formed to flare slantwise and backward.

7. The vehicle seat according to claim 1,
wherein a root of the lower edge flange of the bezel is formed thin, forming a thin-wall part used as fulcrum when the lower edge flange is deformed.

8. The vehicle seat according to claim 7,
wherein sewn parts are formed by sewing the upper edge flange of the bezel to the terminal of the trim cover and,
storing grooves are made in the upper surface of the pad above and below the pad recess, in which the sewn parts are capable of storing.

9. The vehicle seat according to claim 8,
wherein the upper edge flange of the bezel is formed to flare slantwise and backward.

10. The vehicle seat according to claim 7,
wherein an engaging groove is cut in the pad, on the engaging section, and
on the lower edge flange of the bezel, an engaging protrusion is formed, extending forward and engaged in the engaging groove when the lower edge flange restores its original shape.

11. The vehicle seat according to claim 10,
wherein sewn parts are formed by sewing the upper edge flange of the bezel to the terminal of the trim cover and,
storing grooves are made in the upper surface of the pad above and below the pad recess, in which the sewn parts are capable of storing.

12. The vehicle seat according to claim 11,
wherein the upper edge flange of the bezel is formed to flare slantwise and backward.

\* \* \* \* \*